Patented Sept. 1, 1925.

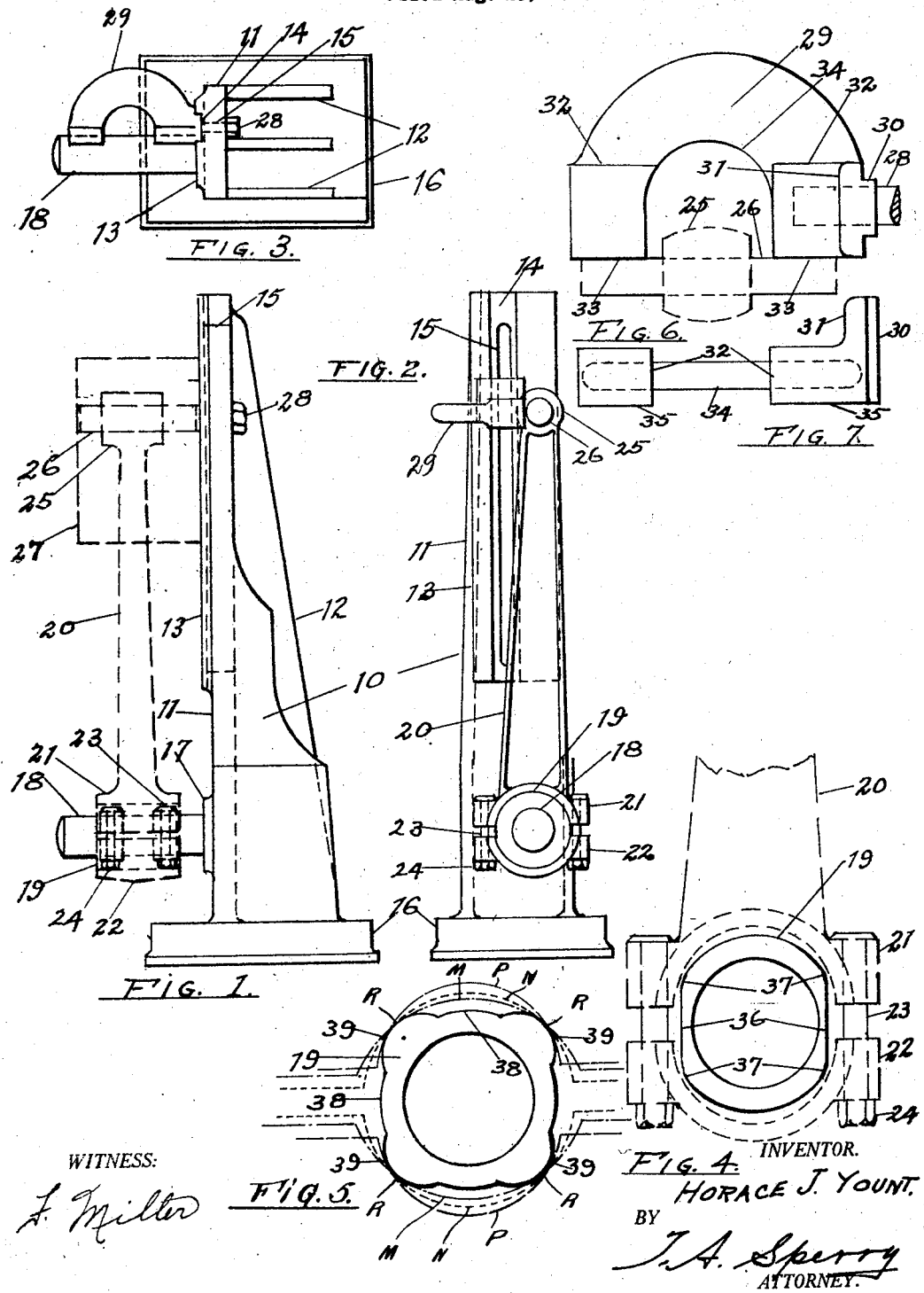

1,552,257

UNITED STATES PATENT OFFICE.

HORACE J. YOUNT, OF INDIANAPOLIS, INDIANA.

PISTON-ALIGNING FIXTURE.

Application filed August 25, 1920. Serial No. 406,029.

*To all whom it may concern:*

Be it known that I, HORACE J. YOUNT, a citizen of the United States, and a resident of the city of Indianapolis, county of Marion, and State of Indiana, have invented certain new and useful Improvements in Piston-Aligning Fixtures, of which the following is a specification.

My invention relates to aligning fixtures in general and more particularly to fixtures for aligning pistons, piston rods, and piston pins for internal combustion motors, and has for its principal object the provision of a device which will quickly, easily and positively indicate the correct alignment or the mis-alignment of a piston or the piston pin with the crank shaft bearing of the connecting rod. A further object is the provision of a device which may be utilized to align either the piston or the piston pin with the crank shaft bearing. A further object is the provision of a device which will indicate the alignment of the piston pin both vertically and horizontally with the connecting rod bearings. A further object is a device having interchangeable bushings to adapt it readily to a wide range and variety of connecting rods. A still further object is a device employing interchangeable bushings of special shapes to reduce the number of such bushings to a minimun.

With these objects in view, and others which will appear with the development of this specification, my invention consists essentially of the details and arrangements illustrated in the accompanying drawings, it being understood that such modifications thereof may be made as will legitimately come within the scope and spirit of the appended claims.

With more particular reference to the drawing, in which like numerals designate like parts throughout:—

Fig. 1 is a side elevation of the device with a connecting rod and piston shown in broken lines thereon; Fig. 2 is a front elevation with the piston eliminated; Fig. 3 is a plan view; Fig. 4 is an enlarged end view of one of the bushings with a fragment of a connecting rod shown thereon; Fig. 5 is a similar elevation of a modified form of bushing; Fig. 6 is a plan view of the pin aligning bracket, and Fig. 7 is a front elevation of this bracket.

With more particular reference to the drawings, the device consists of an upright column 10, having a front panel 11 reinforced by suitable ribs 12, the panel 11 having an elongated face 13, which is accurately machined at right angles to a stud 18, rigidly mounted in a boss 17, near the base 16 of the column 10. The face 13 is preferably provided with a vertical groove 14 and an elongated slot 15 for the reception of a sliding block 29 and stud 28 threadedly engaging said sliding block 20 indicates an ordinary connecting rod of a motor, having a bearing head 21 and a bearing cup 22 connected by a plurality of bolts 23 and clamping nuts 24. The sliding block 29 is preferably provided with an elongated foot 31 and a tongue 30, said tongue engaging the groove 14. The block 29 is also provided with a plurality of gaging or aligning heads 32, which are accurately machined on the front faces 33 and the lower faces 35, the block being cut away as at 34 to allow clearance for the rod head 25.

A plurality of interchangeable bushings 19 having different external diameters is provided, which may be slidably mounted on stud 18, being closely fitted to the stud to locate the connecting rod head 21 and cap 22 thereon. In practice those bushings are preferably modified by flattening the outer sides, as at 36 in Fig. 4 and are provided with arcuate corners or blunt protuberances as at 37, so that a single bushing may be used on a relatively wide range of bearing diameters, and these bushings may be further modified as in Fig. 5 to give an even wider range of application. In this form, a plurality of concentric arcs 38 is separated by a plurality of arcuate elements or blunt protuberances 39, diametrically placed, arcs 39 being of a relatively smaller radius than the arcs 38 so that when rods having bores of different diameters, as indicated by the broken lines M, N and P, are mounted thereon they will each contact with the arcs 39 at or near the points R.

In practice, the connecting rod is mounted on stud 18 through the instrumentality of one of the bushings 19 of the proper size, and the sliding block 29 is adjusted vertically in the groove 14 until the faces 33 engage the pin 26. Bolts 23 and stud 28 are then tightened, and the upper end 25 of the rod is moved laterally until pin 26 engages the faces 33. If the engagement of this pin is uniform throughout its length, the horizontal alignment is perfect, but if one end of the pin engages its respective face of block 29 in advance of the other end, the connecting rod must be twisted by any suitable means until the engagement or alignment is perfect. Sliding block 29 is then moved upward until the pin 26 will pass below faces 35 when the rod may be bent until perfect alignment of the pin therewith is secured. When the pin 26 contacts perfectly with both faces 33 and with both faces 35, the pin 26 will be in perfect parallelism with the axis of the bore of the head 21, since this bore is concentric with, and is drawn by bolts 23 to a perfect seat on the arcuate portions 37 (or 39 in Fig. 5) of the bushing 19, which bushing is mounted on stud 18 which is at right angles to the face 13 on which sliding block 29 is mounted.

It is evident that standard cylindrical bushings may be used on stud 18, or a removable bare stud may be used but as each size of bore in the connecting rod would require a different size bushing, or a different size stud, I prefer to employ bushings similar to the types shown in Figs. 4 and 5. With such bushings, a range of four sizes will cover all sizes of bearings from 1¼" to 2½" which are about the maximum diameters of such connecting rod bearings, and these four bushings will cover fractional or odd size or worn bushings within these limits, as is illustrated by contact points 37 in Fig. 4.

Further, it should be understood that the external contour of the bushing 19 is practically the effective portion of the stud 18, and that the arcuate bearing portions of the bushings may be formed on the stud itself integral therewith, the stud being removable from place so that one of different diameter may be substituted therefor, the bearing portions, however, being preferably provided on bushings separate from the stud as described.

To test the piston, the pin 26 is first brought into proper contact and then the sliding block 29 is removed, and the piston is mounted in the regular manner on the piston pin, and is brought into engagement vertically with the face 13 of column 11, with which it must contact throughout the length of the piston. The piston rod is then preferably reversed on the stud, by sliding off bushing 19, and the opposite side of the piston is then brought into contact with face 13. When this contact is secured in each position we known that the piston is in proper alignment with the connecting rod bearing, and will operate in the motor cylinder without friction, binding or detrimental wear on the cylinder walls.

In other makes of aligning fixtures, it is customary to use a split or two piece, bushing to secure the connecting rod upon the fixture, which necessitates loosening the clamping bolts to operate or reverse the rod upon the fixture. I eliminate this difficulty by using a solid, or one piece bushing, which may be oscillated, removed or reversed without disturbing the clamping members, thus insuring greater accuracy and convenience in its operation. Also by employing a vertical type of construction, I eliminate any possibility of inaccuracy of results due to looseness in the bushings, the clamping members or in the piston when mounted upon its pin.

Having thus described my invention, what I claim as new and desire to protect by Letters Patent is:

1. In an aligning fixture, the combination with a base and an upright having a vertical face thereon, of a stud fixedly mounted on said upright at right angles to said face, a sliding block movably mounted on said face, said block being provided with a plurality of horizontal and a plurality of vertical faces, the axis of said stud being parallel to said faces, and a plurality of bushings adapted to be interchangeably mounted on said stud, said bushings each having on its outer periphery a plurality of radially distributed arcuate lugs of relatively small radius as compared with said stud to engage the bore of articles to be aligned on said fixture.

2. In an aligning fixture, the combination with a vertical column having a base and a vertical aligning face, of a horizontal stud fixedly mounted on said column at right angles to said aligning face, an aligning block, means for securing said aligning block in adjusted position on said aligning face, and bushings adapted to be interchangeably fitted on said stud, each of said bushings having on its outer periphery a plurality of radially distributed arcuate lugs for accurately seating connecting rods on said bushings.

3. In an aligning fixture having a vertical column with a stud fixedly mounted thereon, said column having an aligning face at right angles to said stud and a vertical groove in said face, the combination of an aligning block adjustably arranged on said aligning face and having a tongue extending into said groove to guide the block, said block being provided with a pair of horizontal and a pair of vertical faces, said faces being in parallelism with said stud, means for adjustably securing said aligning block to said aligning face, and bushings adapted to be interchangeably fitted on said stud, each bushing having on its outer periphery a plurality of radially distributed arcuate lugs so that bores of different diameters may be accurately secured upon said arcuate elements.

4. In an aligning fixture having a vertical column carrying a vertical aligning face thereon, the combination of a stud mounted on said column at right angles to said face, an aligning block having a plurality of faces, said aligning block being provided with means whereby it is adjustably mounted on said aligning face, said faces on said aligning block being in parallelism with the axis of said stud, and a plurality of one piece bushings adapted to be interchangeably and reversibly mountable on said stud, said bushings each having on its outer periphery a plurality of radially distributed arcuate lugs of relatively small radius as compared with said stud for mounting connecting rods of different diameters accurately on said stud, whereby a maximum range of rod diameters may be secured upon a minimum number of said bushings, substantially as and for the purpose described.

5. In aligning apparatus, the combination of an elongated frame having a plane face in proximity to one end and a cylindrical stud in proximity to the opposite end thereof, the stud being rigid on the frame and arranged at right angles to the plane face, the frame having a longitudinal guide groove extending from said face and a slot extending from the bottom of the groove, a head block guided in said groove and having a securing device arranged in said slot, said block being provided with two aligning faces presented towards said stud and also two aligning faces at right angles to the first-mentioned aligning faces, said block being adjustable towards or from said stud, and a bushing adapted to be adjusted on said stud and having on its outer periphery a plurality of radially distributed arcuate lugs.

6. An aligning apparatus comprising an elongated frame having a plane face in proximity to one end thereof and a stud removably secured to the frame in proximity to the opposite end thereof, the stud and the plane face being on one and the same side of the frame, the stud being arranged at right angles to the plane face and having on its outer periphery a plurality of radially distributed arcuate lugs, and a head block mounted on the plane face of the frame and adjustable towards or from the stud, the head block having two aligning faces presented towards the stud and also two aligning faces on a plane at a right angle to the plane of the first-described aligning faces.

7. Aligning apparatus comprising an elongated frame having a plane face in proximity to one end and a fixed cylindrical stud in proximity to the opposite end thereof, the stud having its longitudinal axis at right angles to the plane face, a bushing device adapted to be adjustable on the stud and having on its outer periphery a plurality of radially distributed arcuate lugs, and a head block mounted on the plane face and adapted to be adjusted towards or from the stud, the head block having two aligning faces presented towards the stud and also two aligning faces on a plane at a right angle to the plane of the first-described aligning faces.

8. Aligning apparatus comprising an elongated frame having a plane face in proximity to one end and a stud in proximity to the opposite end thereof, the stud being rigid on the frame and arranged with its longitudinal axis at right angles to the plane face, and a head block mounted on the plane face and adjustable towards or from the stud, the head block having two aligning faces presented towards the stud and also two aligning faces on a plane at a right angle to the plane of the first-described aligning faces.

9. A gage for testing connecting rods and the like and having a plane surface and a member projecting from said surface, said member having protruding contact points arranged in more than two series and adapted to engage the crank pin bearing surface of a connecting rod, the points of each series lying in a straight line, said lines being parallel to each other and perpendicular to said plane surface.

10. A gage for testing connecting rods and the like and having a plane surface, a pin having portions perpendicular to said surface to receive the crank pin bearing surface of a connecting rod and position the same with its axis perpendicular to said plane surface, and a gage block presenting portions to contact the wrist pin carried by the rod supported on said first mentioned pin and having contact portions lying in a common plane to co-operate with said plane surface.

In witness whereof, I hereunto set my hand.

HORACE J. YOUNT.